SEARCH MEMORY MATCH LOGIC DETECTOR

Filed May 2, 1966 Sheet 1 of 3

INVENTOR
LOUZELLE A. LUKE

BY Thomas J. Nikolai
ATTORNEY

INVENTOR
LOUZELLE A. LUKE

BY Thomas J. Nikolai
ATTORNEY

INVENTOR
LOUZELLE A. LUKE
BY Thomas J. Nikolai
ATTORNEY

United States Patent Office 3,432,686
Patented Mar. 11, 1969

3,432,686
SEARCH MEMORY MATCH LOGIC DETECTOR

Louzelle Albert Luke, Coon Rapids, Minn., assignor to Sperry Rand Corporation, New York, N.Y., a corporation of Delaware

Filed May 2, 1966, Ser. No. 546,626
U.S. Cl. 307—231 6 Claims
Int. Cl. H03k *5/20, 3/26, 3/34*

ABSTRACT OF THE DISCLOSURE

A semiconductor circuit that is capable of performing match logic as a detector of a Search memory system and is assigned to the Sperry Rand Corporation.

Figure 1:
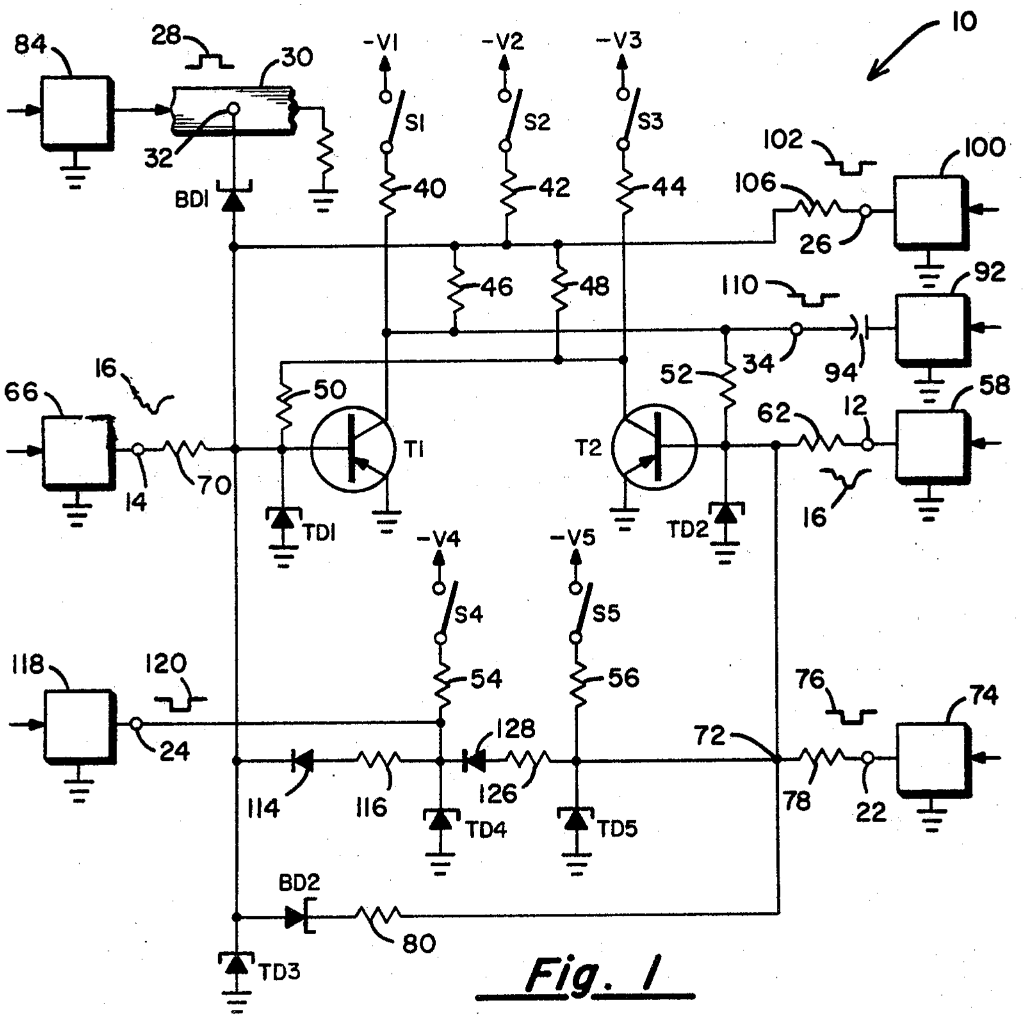

Search memory systems are systems in which typically a known search word is compared to a plurality of unknown memory words to determine a plurality of search functions such as answering the questions: What words in memory are equal to the search word?; What words in memory are greater than the search word?; or, What words in memory are less than the search word? The answers to the questions are typically the addresses in memory of the words satisfying those search function criteria. Many different Search memory system arrangements are utilized; including arrangements storing the true and complement of the memory words and arrangements storing only the true of the memory words to effectuate the necessary comparisons. See the following articles for discussions of some typical Search memory systems: A Search Memory Subsystem for a General Purpose Computer, Albert Kaplan, pages 193–220, Proceedings of the Fall Joint Computer Conference, 1963; Associative Memories, Alan Corneretto, pages 40–45, Electronic Design, Feb. 1, 1963; V. J. Korkowski Patent No. 3,192,512; W. W. Davis Patent No. 3,222,645; and D. E. Keefer Patent No. 3,155,945.

The present invention is directed toward a match logic detector that is capable of evaluating the output of a Search memory system in a more efficient manner than was previously possible. Present research in Search memory systems is directed toward the development of detectors that are capable of accepting an extremely low level Search memory array output signal without any amplification and performing the necessary "lock-out" of subsequent output signals coupled thereto. As present day Search memory systems generally require a separate amplifier and a separate detector for each memory word it is apparent that large Search memory systems require a considerable number of output (sense) amplifiers. To provide a practical (economy wise) Search memory system, it is therefore desirable that the sense amplifiers be eliminated and that their function be absorbed by the associated detectors. In many Search memory functions it is necessary that the detectors react to only the first Search memory output signal and thereafter to remain uneffected by any subsequent output signal coupled thereto; this function is termed "lock-out" in that any output signal subsequent to the first output signal coupled thereto is locked-out of the detector so as to produce no effect upon the detector's previously set state. The detector of the present invention accomplishes both of these functions in an improved manner.

Accordingly, it is a primary object of the present invention to provide an electronic circuit that is capable of functioning as a match logic detector when combined with a Search memory system.

It is another object of the present invention to provide an electronic circuit that incorporates tunnel diodes that are capable of reacting to the low level signal of a memory array without intermediate amplification thereof.

These and other more detailed and specific objects will be disclosed in the course of the following specification, reference being had to the accompanying drawings.

With particular reference to FIG. 1 there is disclosed a preferred embodiment of the present invention as a match logic detector for a Search memory. The Search memory of this application is organized into two half sections; one section containing the true form of a multibit word stored in memory and the other section containing the complement form of the multibit word stored in memory. A search register holds the word searched for with each bit of the multibit search word coupled serially to all the correspondingly ordered true or complement bits of the plurality of words in memory. If a particular bit of the search word is a "0" it drives all the true forms of the corresponding ordered bits of the memory words while if it is a "1" it drives all the complement forms of the corresponding ordered bits of the memory words. The memory elements of the Search memory are such that if the bit in the search word matches the bit in the memory word no output signal is induced in the coupled sense line while if the bit in the search word does not match, i.e., mismatches, the bit in the memory word, an output signal is induced in the coupled sense line. Each memory word bit has two associated sense lines; one serially coupled to all the like ordered true bit forms and another serially coupled to all the like ordered complement bit forms.

The search is conducted by initially driving all the serially-coupled, corresponding, highest-ordered bits of the memory words according to the search word bit, with the search continued by bit-serially driving the serially-coupled, corresponding ordered bits of the memory words from the highest to the lowest ordered bits of the search word. After the bit serial search is completed the detectors that are coupled to the sense, or output, lines may then be interrogated to determine the results of the prior search. In circuit 10 of FIG. 1 the inputs to terminals 12 and 14 may be considered to be the outputs of the true and the complement sense lines, respectively, of the memory words of a Search memory array; a mismatch of a true form produces a pulse-like output signal on a true sense line and a mismatch of a complement form produces a pulse-like output signal on a complement sense line, while a match on either form produces no output signal.

Figure 2:
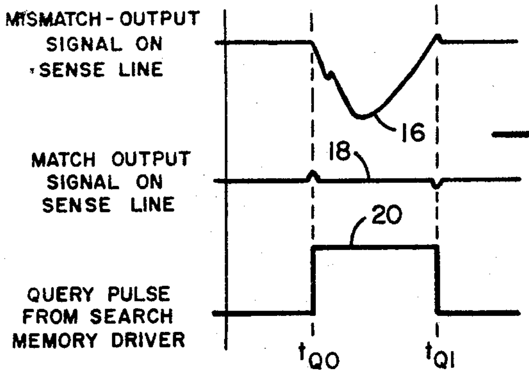

With particular reference to FIG. 2 there is presented an illustration of the signals associated with the Search memory system generally described above: signal 16 is representative of a mismatch output signal; signal 18 is representative of a match output signal; and, signal 20 is representative of a query pulse that is initiated by the search register causing either signal 16 or 18 to be induced in the associated sense line and thence to be coupled to terminals 12 or 14 of circuit 10 of FIG. 1. The Search memory system that is associated with circuit 10 may be similar to the true-complement Search memory system disclosed in the V. J. Korkowski patent application Ser. No. 384,885, filed July 24, 1964, and assigned to the Sperry Rand Corporation, as is the present invention. With particular reference to circuit 10 of FIG. 1, predetermined control signals are selectively coupled to input terminals 22, 24 and 26 for the proper effecting of circuit 10 such that when an interrogating signal 28 on transmission line 30 is subsequently coupled to input terminal 32 there is produced at output terminal 34 a signal that is representative of the determination of the search function criterion as performed by the associated Search memory system.

Figure 3:
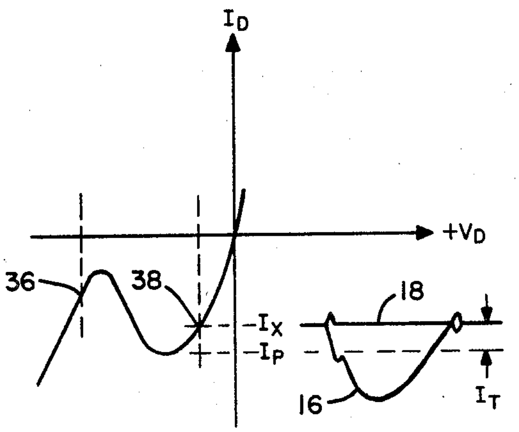

When the reference voltages V1–V5 of FIG. 1 are initially coupled to their respective means for receiving such reference signals upon the closing of their associated switches S1–S5, circuit 10 is established into an initial set state; transistors T1 and T2 are biased into their nonconductive state and tunnel diodes TD1, TD2 and TD3 are biased into their low voltage state—such as point 38 of FIG. 3 wherein there is illustrated a typical I–V characteristic of tunnel diodes TD1–TD5—through the voltage divider network formed by resistors 40–52; and, tunnel diodes TD4 and TD5 are biased into their low voltage state—such as point 38 of FIG. 3—by the voltage divider networks of resistors 54, 56, respectively.

A first mode of operation of circuit 10 is then achieved as follows. With circuit 10 in its initial set state when pulse source 58 couples a negative pulse 16 to terminal 12 and thence to the base of transistor T2 through resistor 62, tunnel diode TD2 is driven into its high voltage state—such as point 36 of FIG. 3—which in turn switches transistor T2 into its conducting state. The collector of transistor T2, being coupled back to the base of transistor T1 through resistor 50, applies a reverse bias to the base of transistor T1. This bias prevents a subsequent coupling of a negative pulse 16 from pulse source 66—to terminal 14 through resistor 70 and thence to the base of transistor T1—from causing tunnel diode TD1 to be driven into its high voltage state and in turn switching transistor T1 into its conducting state.

It is apparent that due to the symmetry of the circuitry associated with transistors T1 and T2 and tunnel diodes TD1 and TD2 the coupling of a pulse 16 to terminals 12 or 14 causes tunnel diode TD2 or tunnel diode TD1, respectively, to be set into its high voltage state from its low voltage state which in turn causes transistor T2 or transistor T1, respectively, to be switched into its conducting state from its nonconducting state. Additionally, it is apparent that for the proper operation of circuit 10 the coupling of pulse 16 to either terminals 12 or 14 are mutually exclusive conditions whereby the coupling of pulse 16 to one of such terminals 12 or 14 "locks-out" any subsequent effect of the coupling of the pulse 16 to the other of such terminals. Thus, the first, or set, pulse 16 that is coupled to either terminal 12 or 14 establishes the set condition of circuit 10 unless and until circuit 10 is effected by the application of a predetermined control signal or the selective removal of reference voltages V1–V3 by the opening of switches S1–S3, respectively.

Figure 4:
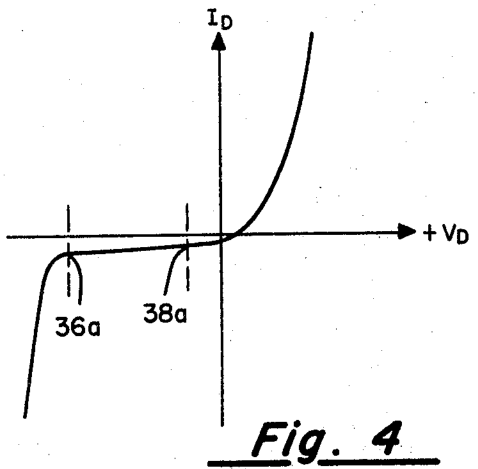

With tunnel diode TD2 in its high voltage state a negative bias—essentially one-half of an AND function—is applied to the cathode of tunnel diode TD5 through node 72—tunnel diode TD2 is normally biased into a slightly higher voltage level than is tunnel diode TD5. Now, when pulse source 74 is subsequently triggered so as to couple a pulse 76 to terminal 22 and thence through resistor 78 to node 72, tunnel diode TD5 is set into its high voltage state. Next, tunnel diode TD1 and tunnel diode TD2 are then both set into their low voltage state by the momentary opening of switches S1–S3 in the absence of pulse 76. Upon the closing of switches S1–S3 the negative bias at the cathode of tunnel diode TD5 is applied to the cathode of tunnel diode TD1 and tunnel diode TD3 by way of resistor 80 and backward diode BD2 whereupon tunnel diode TD1 is set into its high voltage state causing transistor T1 to conduct—tunnel diode TD3 is selected to have a higher $I_p$ than does tunnel diode TD1. When pulse source 84 is subsequently triggered and caused to couple a positive pulse 28 to transmission line 30, pulse 28 travels down transmission line 30 to point 32 whereupon backward diode BD1, which is biased into its high voltage state—such as point 36*a* of FIG. 4 wherein there is illustrated a typical I–V characteristic of backward diodes BD1 and BD2—due to the biasing effect of tunnel diode TD1, presents a low impedance to pulse 28 coupling pulse 28 to the base of transistor T1 and the cathode anode of tunnel diode TD1. Pulse 28 sets tunnel diode TD1 into its low voltage state causing transistor T1 to switch into its nonconducting state. The sudden nonconduction of transistor T1 causes the collector of transistor T1 to go more negative, coupling a negative going pulse 110 to utilization device 92 at terminal 34 by means of capacitor 94. Alternatively, if when pulse 28 passed point 32 backward diode BD1 were in its low voltage state—such as point 28*a* of FIG. 4—backward diode BD1 would appear as a high impedance to pulse 28 causing pulse 28 to continue on down transmission line 30. The opening, at any time, of switches S1–S5 removes reference voltages V1–V5 from circuit 10 causing circuit 10 to achieve an inactive state. The subsequent closing of switches S1–S5 establishes circuit 10 into its initial set state as discussed above.

With circuit 10 established in its initial set state as described above, a second mode of operation is achieved as follows. When neither pulse source 66 nor pulse source 58 are triggered to couple a pulse 16 to their respective terminals 14 or 12, circuit 10 remains in its initial set state. In this initial set state the collector voltages of transistor T1 and transistor T2 are both of equal negative bias values—are coupled to the cathode of TD3 through their associated resistors 46 and 48 biasing tunnel diode TD3 into its low voltage state as before. Next, if pulse source 100 is triggered to couple a negative pulse 102 to terminal 26, pulse 102, through resistor 106, combines with such negative bias at the cathode of tunnel diode TD3—essentially the enabling of an AND function—to set TD3 into its high voltage state. Next, tunnel diodes TD1 and TD2 are both set into their low voltage state by the removal of reference voltages V1 and V3 by the opening of switches S1 and S3 and the removal of pulse 102 at terminal 26. The negative bias of the cathode of tunnel diode TD3 is then coupled to the cathode of tunnel diode TD1 setting tunnel diode TD1 into its high voltage state and causing transistor T1 to conduct. Subsequent coupling of a pulse 28 to transmission line 30 by pulse source 84 finds that at point 32 backward diode BD1 is biased into its high voltage state—most negative as at point 36*a* of FIG. 4—whereby pulse 28 is coupled to the base of transistor T1 causing transistor T1 to switch into its nonconducting state. The sudden nonconduction of transistor T1 drives the collector of transistor T1 more negative generating a negative going signal 110 that is capacitively coupled to utilization device 92 at terminal 34 by capacitor 94.

With circuit 10 established in its initial set state as described above a third mode of operation is achieved as follows. When pulse source 66 is triggered to couple a negative pulse 16 to terminal 68 and thence to the base of transistor T1 through resistor 70, tunnel diode TD1 is driven into its high voltage state which in turn switches transistor T1 into its conducting state. The collector of transistor T1 being coupled back to transistor T2 through resistor 52, applies a bias to the base of transistor T2. This bias, as described above, prevents the subsequent coupling of a negative pulse 16 from pulse source 58 from causing tunnel diode TD2 to be driven into its high voltage state and in turn switching transistor T2 into its conducting state. When pulse source 84 is subsequently triggered and caused to couple to positive pulse 28 to transmission line 30, pulse 28 travels down transmission line 30 to point 32 whereupon backward diode BD1, which is biased into its high voltage state—such as point 36*a* of FIG. 4—due to the biasing effect of tunnel diode TD1, presents a low impedance to pulse 28 coupling pulse 28 to the base of transistor T1 and the anode of tunnel diode TD1. Pulse 28 sets tunnel diode TD1 into its low voltage state causing transistor T1 to switch into its nonconducting state. The nonconduction of transistor T1 causes the collector of transistor T1 to go more negative coupling a negative going pulse 110 to utilization device 92 at terminal 34 by means of capacitor 94. Alternatively, if when pulse 28 passed point 32 backward diode BD1 were in its low voltage state—such as point 38*a* of FIG.

4—backward diode BD1 would appear as a high impedance to pulse 28 causing pulse 28 to continue on down transmission line 30 whereupon no signal would be coupled to utilization device 92.

With circuit 10 established in its initial set state as described above, a fourth mode of operation is achieved as follows. When pulse source 66 is triggered to couple a negative pulse 16 to terminal 14 and thence to the base of transistor T1 through resistor 70, tunnel diode TD1 is driven into its high voltage state which in turn switches transistor T1 into its conducting state. The collector of transistor T1, being coupled back to the base of transistor T2 through resistor 52, applies a negative bias to the base of transistor T2. This bias prevents the subsequent coupling of a negative pulse 16 from pulse source 58 from causing tunnel diode TD2 to be driven into its high voltage state and in turn switching transistor T2 into its conducting state. With tunnel diode TD1 in its high voltage state a negative bias—essentially one-half an AND function—is applied to the cathode of tunnel diode TD4 through diode 114 and resistor 116. Now, when pulse source 118 is subsequently triggered so as to couple a negative pulse 120 to terminal 24 and thence to the cathode of tunnel diode TD4, tunnel diode TD4 is set into its high voltage state. Next, circuit 10, with the exception of tunnel diode TD4, is set into its initial set state by the momentary opening of switches S1–S3 and S5 in the absence of pulse 120. When pulse source 58 is subsequently triggered to couple a pulse 16 to terminal 12 the operation as described in the first mode of operation is repeated setting tunnel diode TD5—the bias of tunnel diode TD4 replacing the effect of pulse 76—into its high voltage state. At this time both tunnel diode TD4 and tunnel diode TD5 are both set into their high voltage state with their respective cathodes intercoupled by means of resistor 126 and diode 128. Next, tunnel diode TD1 and tunnel diode TD2 are set into their low voltage state by the momentary opening of switches S1–S3 as before. Upon the reapplication of reference voltages V1–V3 upon the closing of switches S1–S3 the negative bias of tunnel diode TD5, through resistor 80 and diode 82, is reapplied to the cathode of tunnel diode TD1 resetting tunnel diode TD1 into its high voltage state. Subsequent coupling of a pulse 28 to transmission line 30 by pulse source 84 finds at point 90 that backward diode BD1 is biased into its high voltage state—most negative as at point 36*a* of FIG. 4—whereby pulse 28 is coupled to the base of transistor T1 causing transistor T1 to switch into its nonconducting state. The sudden nonconduction of transistor T1 drives the collector of transistor T1 more negative generating a negative going signal 110 that is capacitively coupled to utilization device 92 at terminal 96 by means of capacitor 94.

Figure 5:
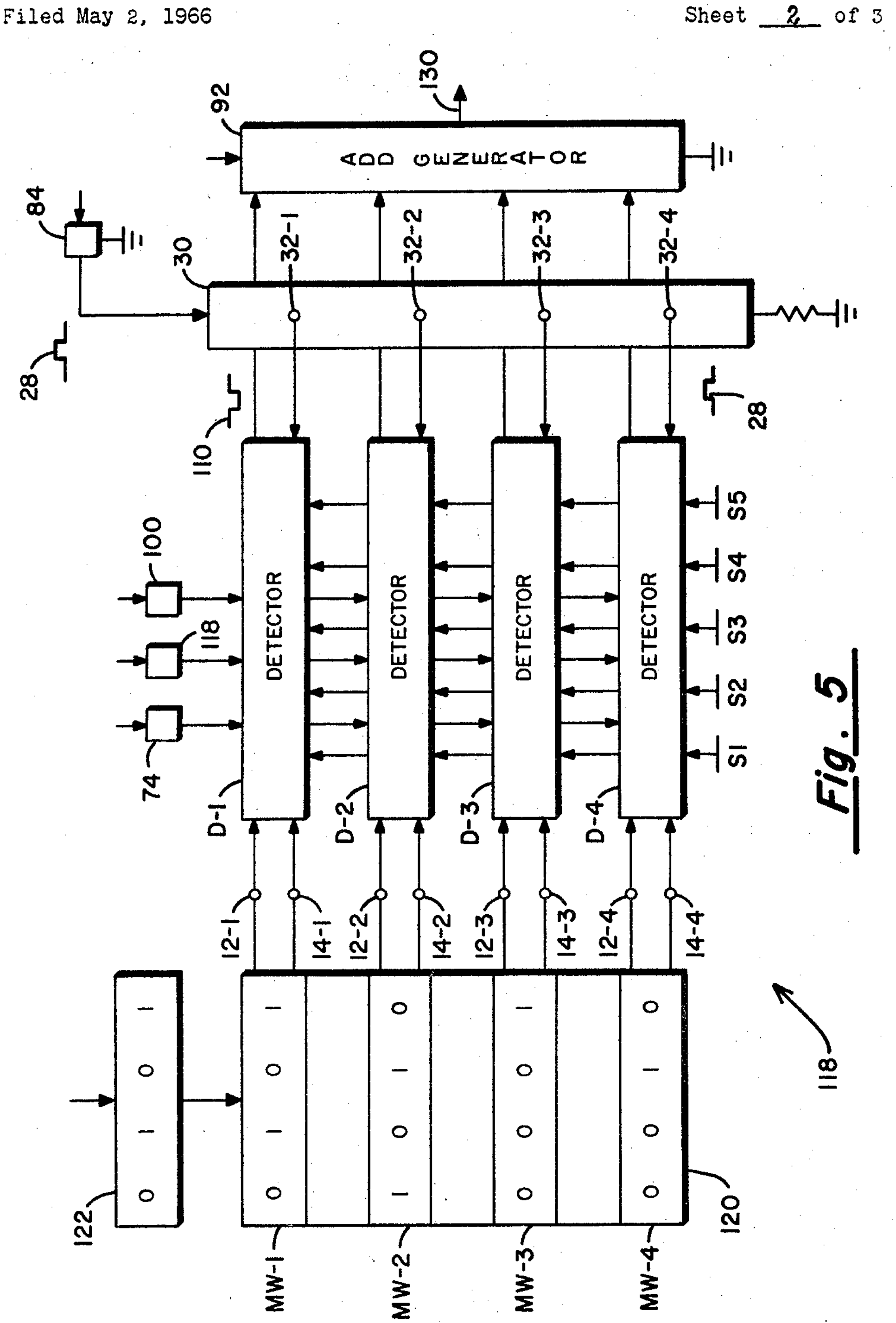

With particular reference to FIG. 5 there is illustrated a Search memory system 118 incorporating the match logic detector 10 illustrated in FIG. 1. In this Search memory system, memory 120 has an illustrated capacity of four 4-bit memory words MW–1 through MW–4; each memory word is coupled to its respectively associated match logic detector 10, D–1 through D–4. The operation of this system is as discussed with respect to FIG. 1 above wherein similar elements are identified by similar reference numerals. After an initial set-up operation in which detectors D–1 through D–4 are established in their initial set state as described with particular reference to the description of FIG. 1 the search word or the word that is to be compared to memory words MW–1 through MW–4 of memory 120 is inserted into search register 122. The search is conducted by initially driving all the serially coupled corresponding highest ordered bits of the memory words accordingly to the search word bit with the search continued by bit serially driving the serially coupled correspondingly ordered bits of the memory words from the highest to the lowest ordered bits of the search word.

After the bit serial search is completed, the detectors D–1 through D–4 may then be interrogated to determine the results of the previous search. The interrogation of detectors D–1 through D–4 is, as previously described with respect to the operation of the circuit of FIG. 1, accomplished by pulse source 84 being triggered causing a pulse 28 to be coupled to transmission line 30. As pulse 28 passes down transmission line 30 it passes along points 32–1 through 32–4 causing an appropriate output signal to be emitted by detectors D–1 through D–4 the output signal is coupled to address generator 92 that provides an output signal, when triggered, that is representative of the memory address of the memory word in memory 120 that is associated with the respectively associated detector D–1 through D–4 that coupled its output signal to address generator 92. It is apparent that the first low impedance node at points 32–1 through 32–4 permits pulse 28 to pass therethrough leaving subsequent low impedance node uneffected. Accordingly each detector D–1 through D–4 that presents a low impedance node requires the application of a separate pulse 28; if no detector presents a low impedance node at a pulse 28, pulse 28 passes down transmission line 30 to ground. This above described search-interrogation cycle is particularly associated with the four different modes of operation previously described with respect to the detector circuit of FIG. 1:

(a) Mode 1 performs the greater-than search function detecting what memory words in memory 120 are greater than the search word in search register 122.

(b) Mode 2 performs the equality search function detecting what memory words in memory 120 are equal to the search word in search register 122.

(c) Mode 3 performs the less-than search function detecting what memory words in memory 120 are less than the search word in search register 122.

(d) Mode 4 performs the between-limits search function detecting what memory words in memory 120 are between the limits of a first upper limit search word and a second lower limit search word in search register 122.

As an example of the operation of detector 12 as discussed with particular reference to FIG. 1 in the operation of modes 1 through 4, assume that a search operation is to be conducted on the system of FIG. 5. The search operation, as described above, is conducted by initially driving all the serially coupled, corresponding, highest ordered bits of memory words MW–1 through MW–4 in memory 120 according to the search word bit, with the search continued by bit serially driving the serially coupled corresponding ordered bits of the memory words MW–1 through MW–4 in memory 120 from the highest to the lowest ordered bits of the search word held in search register 122. Assume that the search word held in search register 122 is a multibit binary word 0101 in which the left-most bit is the highest ordered bit and the right-most bit is the lowest ordered bit of the general form of an *n*-bit word.

$$B_{n-1}, B_{n-2} \ldots B_0$$

and that memory words MW–2 through MW–4 as held in memory 120 are 0101, 1010, 0001, and 0010, respectively, as illustrated in FIG. 5.

Figure 6:
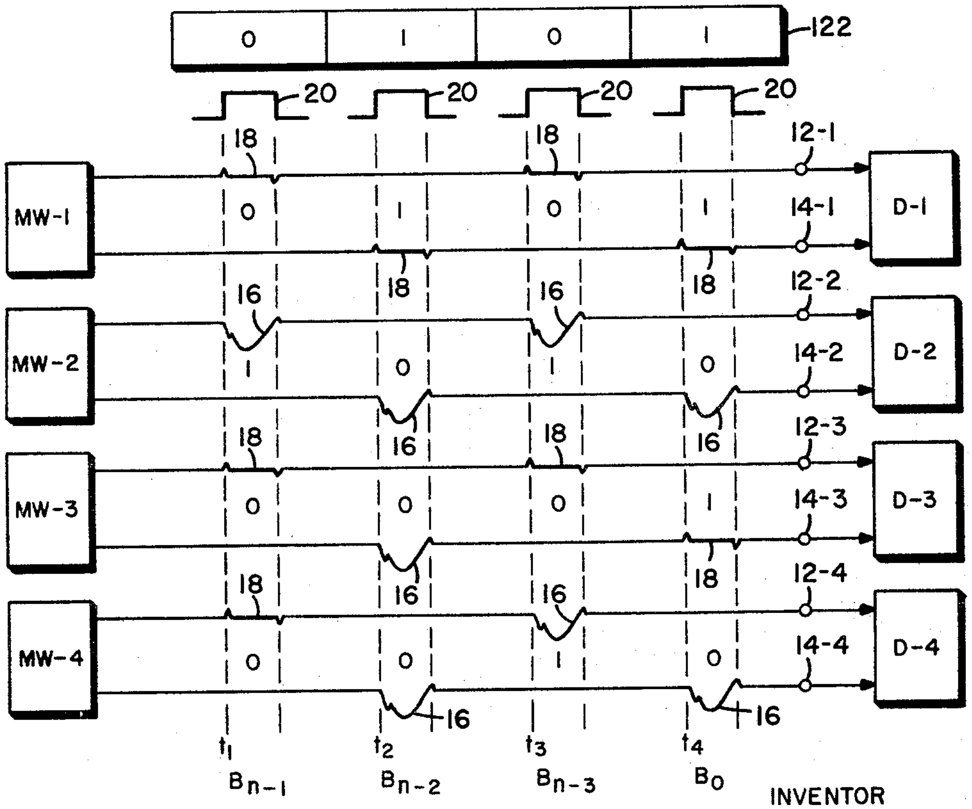

With particular reference to FIG. 6 there are illustrated the output signals on the true-complement sense lines at their respectively associated points 12–14 associated with memory words MW–1 through MW–4 of memory 120 when effected by a bit serial search as determined by the search word 0101 held in search register 122. As previously described, if the particular bit of the search word held in search register 122 is a "0" it drives all the true forms of the corresponding ordered bits of the memory words in memory 120 while if it is a "1" it drives all the complement forms of the corresponding ordered bits of the memory words in memory 120. Further, as was stated hereinabove, the memory elements of memory 120 are such that if the bit in the search word matches the bit in the memory word no output signal is induced in the coupled sense line while if the bit in the search word does not match, i.e., mismatches, the bit in the memory word, an output signal is induced in the coupled sense line. Thus, upon the bit serial comparison of the bits of the search word held in search register 122 to the bits of the memory words held in memory 120 there are produced on the respectively associated true sense line at point 12 and complement sense line at point 14 the pattern of output signals 16, representative of a mismatch and signals 18, representative of a match, when the corresponding memory elements of memory 120 are effected by a query pulse 20 from search register 122—see FIG. 2.

As an example of the operation of system 118 of FIG. 5 assume that an equality search is to be performed, i.e., a determination of what memory words in memory 120 are equal to the search word in search register 122. An inspection of FIG. 5 indicates that only MW–1 is equal to the search word. Accordingly, after completion of the search operation only detector D–1 should couple an output signal to address generator 92 upon interrogation by pulse 28 flowing down transmission line 30.

The equality search operation is initiated, with detectors D1 through D–4 in their initial set state as described in Mode 2 operation and with the search word 0101 inserted in search register 122, by the triggering of search register 122 enabling search register 122 to couple appropriate drive signals to memory 120. The search is conducted by initially driving all the serially coupled corresponding highest ordered bits of the memory words according to the search word bit, with the search continued by bit serially driving the serially coupled corresponding ordered bits of the memory words from the highest to the lowest ordered bits of the search word. After the bit-serial search is completed, the detectors D–1 through D–4 that are coupled to the outputs of memory words MW–1 through MW–4 may be interrogated to determine the result of the search.

An inspection of FIG. 6 indicates that after completion of the bit-serial comparison of the search word in search register 122 to the memory words in memory 120 only detector D–1 had not been affected by a mismatch signal 16 at points 12 or 14 while detector D–1 has been affected by an initial mismatch signal 16 at point 12 and detectors D–3 and D–4 have been affected by an initial mismatch signal 16 at point 14. It is to be remembered here that in the previous discussion of the operation of circuit 10 only the initial mismatch signal 16 is effective as regards the changing of the state of the affected detector, all subsequent signals 16 being locked-out of the coupled detector, while match signal 18 is ineffective as regards the state of the coupled detectors.

Next, the detectors must be programmed, or conditioned, prior to the coupling of an interrogating pulse 28 thereto. This is, as previously described with respect to the operation of circuit 10, because the interrogate pulse 28 is coupled only to a tunnel diode TD–1 of each detector. As the equality search determines those detectors that have been affected by a mismatch signal 16 on either point 12 or 14 the effect of a mismatch signal 16 on point 14 must be transferred from tunnel diode TD–2 to tunnel diode TD–1 of the affected detector whereby all detectors receiving a mismatch signal 16 on either point 12 or 14 will present at the cathode of its tunnel diode TD–1 a high impedance to pulse 28. Thus, those detectors presenting a high impedance to pulse 28 will not emit an output pulse 110 on its terminal 34 while those detectors presenting a low impedance to pulse 28 will emit an output pulse 110 on its terminal 34 which output pulse 110 is in turn coupled to address generator 92.

(1) The first conditioning step is to perform Mode 1 to transfer the effect of the mismatch signal 16 at point 12 of detector D–2 to the cathode of tunnel diode TD–1 of detector D–2. This causes detector D–2 to present a high impedance node at its point 32.

(2) The second conditioning step is to perform Mode 2 to condition the cathode of tunnel diode TD–2 of detector D–1 to present a low impedance node at its point 32.

(3) The third conditioning step is to perform Mode 3 to transfer the effect of the initial mismatch signal 16 at point 14 of detectors D–3 and D–4 to the cathodes of their respective diodes TD–1. This causes detectors D–3 and D–4 to present a high impedance node at their points 32.

After completion of the three conditioning steps above, pulse source 84 is triggered enabling it to couple a pulse 28 on transmission line 30. Pulse 28 travels down transmission line 30 and upon reaching point 32–1 is coupled to the low impedance node presented by detector D–1 causing detector D–1 to couple an output pulse 110 to address generator 92 which translates such signal into a digital signal that is representative of the address of memory word MW–2 in memory 120. Address generator 92 when triggered emits such digital signal on the output line 130. Pulse generator 84 is then triggered again enabling it to couple a pulse 28 to transmission line 30. Pulse 28 travels down transmission line 30 past point 32–1, it now presenting a high impedance node to pulse 28, and past points 32–2, 32–3 and 32–4 to ground, all such points presenting a high impedance node to pulse 28.

It is understood that suitable modifications may be made in the structure as disclosed provided that such modifications come within the spirit and scope of the appended claims. Having now, therefore, fully illustrated and described my invention, what I claim to be new and desire to protect by Letters Patent is set forth in the appended claims.

I claim:

1. A match logic detector comprising:
first, second, third and fourth switch means;
first and second transistors, each having collector, emitter and base electrodes;
voltage divider means coupling the base and collector electrodes of said first and second transistors to said first, second and third switch means;
means coupling the emitter electrode of said first transistor to ground;
means coupling the emitter electrode of said second transistor to ground;
first, second, third and fourth tunnel diode means;
first backward diode means;
said first and third tunnel diode means parallelly coupling the base electrode of said first transistor to ground;
said second tunnel diode means coupling the base electrode of said second transistor to ground;
serially aligned first resistor means and said first backward diode means intercoupling the base electrodes of said first and second transistors;
serially aligned second resistor means and fourth tunnel diode means coupling said fourth switch means to ground; and,
means coupling the common connection of said second resistor means and said fourth tunnel diode means to the base electrode of said second transistor.

2. The match logic detector of claim 1 further including a second backward diode means for coupling an interrogate pulse to the base electrode of said first transistor.

3. The match logic detector of claim 2 wherein said fourth tunnel diode means is normally biased into a slightly lower voltage level than is said second tunnel diode means.

4. The match logic detector of claim 3 wherein said third tunnel diode means has a slightly higher $I_p$ than does said first tunnel diode means.

5. The match logic detector of claim 4 further including:
fifth switch means;
serially aligned third resistor means and fifth tunnel diode means for coupling said fifth switch means to ground;
serially aligned first diode means and fourth resistor means intercoupling the common connection of said serially aligned third resistor means and fifth tunnel diode means and the common connection of said second resistor means and said fourth tunnel diode means; and,
serially aligned second diode means and fifth resistor means coupling the common connection of said serially aligned third resistor means and fifth tunnel diode means to the base electrode of said first transistor.

6. A match logic detector comprising:
first, second, third, fourth and fifth switch means;
means for receiving first, second, third, fourth and fifth reference signals and each associated with its like ordered switch means;
first and second transistors, each having collector, emitter and base electrodes;
first, second, third, fourth and fifth tunnel diode means, each having an anode electrode and cathode electrode;
first and second backward diode means, each having anode electrode and a cathode electrode;
first and second diode means, each having an anode electrode and a cathode electrode;
first and second signal means each coupled to first and second input signal terminals, respectively, for mutually exclusively coupling first or second input signals thereto;
first, second and third control signal sources each coupled to first, second and third control signal terminals, respectively, for mutually exclusively coupling first, second or third control signals, respectively, thereto;
first utilization means capacitively coupled to a first output terminal for receiving an output signal indicative of the conductive state of said first transistor;
first interrogate means coupled to the cathode electrode of said first backward diode means for coupling an interrogate signal thereto;
first resistor means coupling the base electrode of said first transistor to the collector electrode of said second transistor;
second resistor means coupling the base electrode of said second transistor to the collector electrode of said first transistor;
said first tunnel diode means coupling the base electrode of said first transistor to ground;
said second tunnel diode means coupling the base electrode of said second transistor to ground;
means coupling the emitter electrode of said first transistor to ground;
means coupling the emitter electrode of said second transistor to ground;
means coupling said first input signal terminal to the base electrode of said first transistor;
means coupling said second input signal terminal to the base electrode of said second transistor;
means coupling said first output terminal to the collector electrode of said first transistor;
third resistor means coupling said first switch means to the collector electrode of said first transistor;
fourth resistor means coupling said second switch means to the base electrode of said first transistor;
fifth resistor means coupling said third switch means to the collector electrode of said second transistor;
sixth resistor means intercoupling the base and collector electrodes of said first transistor;
seventh resistor means coupling the base electrode of said first transistor to the collector electrode of said second transistor;
means coupling said first control signal terminal to the base electrode of said first transistor;
means coupling said second control signal terminal to the base electrode of said second transistor;
said third tunnel diode means coupling the base electrode of said first transistor to ground;
serially aligned eighth resistor means and said second backward diode means intercoupling the base electrodes of said first and second transistors;
means coupling the anode electrode of said first backward diode means to the base electrode of said first transistor;
serially aligned ninth resistor means and said fourth tunnel diode means coupling said fourth switch means to ground;
serially aligned tenth resistor means and fifth tunnel diode means coupling said fifth switch means to ground;
serially aligned eleventh resistor means and first diode means intercoupling the common connection of said tenth resistor means and said fifth tunnel diode means to the common connection of said ninth resistor means and said fourth tunnel diode means;
means coupling the common connection of said tenth resistor means and said fifth tunnel diode means to the base electrode of said second transistor;
serially aligned twelfth resistor means and said second diode means intercoupling the base electrode of said first transistor and the common connection of said ninth resistor means and said fourth tunnel diode means;
means coupling the common connection of said ninth resistor means and said fourth tunnel diode means to said third control signal terminal.

References Cited

UNITED STATES PATENTS

| | | | |
|---|---|---|---|
| 3,067,336 | 12/1962 | Eachus | 307—258 |
| 3,102,209 | 8/1963 | Pressman | 307—322 |
| 3,178,592 | 4/1965 | Fisher et al. | 307—282 |

ARTHUR GAUSS, *Primary Examiner.*

B. P. DAVIS, *Assistant Examiner.*

U.S. Cl. X.R.

307—321, 322